United States Patent [19]
Matsui

[11] Patent Number: 5,874,141
[45] Date of Patent: Feb. 23, 1999

[54] INJECTION/BLOW MOLDED PLASTIC CONTAINER AND METHOD

[75] Inventor: Yutaka Matsui, Bardstown, Ky.

[73] Assignee: Inoac Packaging Group, Inc., Bardstown, Ky.

[21] Appl. No.: 627,854

[22] Filed: Apr. 3, 1996

[51] Int. Cl.[6] .............................. B29D 22/00; B29C 49/02
[52] U.S. Cl. ................... 428/36.9; 428/35.7; 428/542.8; 215/371; 264/523; 264/526; 264/537; 264/294; 264/331.11
[58] Field of Search ..................................... 264/533, 526, 264/537, 573, 294, 320, 328.1, 331.11; 428/35.7, 36.9, 36.92, 542.8; 215/371

[56] References Cited

U.S. PATENT DOCUMENTS

| | | |
|---|---|---|
| 2,805,787 | 9/1957 | Sherman ................................. 220/445 |
| 3,091,000 | 5/1963 | Makowski . |
| 3,113,831 | 12/1963 | Coale . |
| 3,450,254 | 6/1969 | Miles . |
| 3,816,578 | 6/1974 | Fuller . |
| 3,851,030 | 11/1974 | Valyi . |
| 3,893,882 | 7/1975 | Repenning . |
| 3,898,310 | 8/1975 | Schiemann . |
| 4,164,298 | 8/1979 | Nishikawa et al. . |
| 4,179,488 | 12/1979 | Nishikawa et al. . |
| 4,293,520 | 10/1981 | Akutsu . |
| 4,298,567 | 11/1981 | Aoki . |
| 4,439,393 | 3/1984 | Saito et al. . |
| 4,588,620 | 5/1986 | Marcinek . |
| 4,589,563 | 5/1986 | Born . |
| 4,590,021 | 5/1986 | Ota el al. . |
| 4,952,133 | 8/1990 | Hasegawa et al. . |
| 5,000,904 | 3/1991 | Schiemann . |
| 5,043,130 | 8/1991 | Fujio . |
| 5,049,349 | 9/1991 | McCullough et al. . |
| 5,116,565 | 5/1992 | Yoshino . |
| 5,248,533 | 9/1993 | Sugiura et al. . |

*Primary Examiner*—Fred Teskin
*Attorney, Agent, or Firm*—King and Schickli

[57] ABSTRACT

A plastic container is formed by injection and blow molding wherein the injection molded body has an annular shoulder, an upper neck and a bottom wall with a central flat portion of substantially the same thickness as the wall of said body. An enlarged annular corner portion connects the bottom wall to the body and extends downwardly. The annular corner is sufficiently thick so as to form a substantially solid rim after bi-axial stretching during blow molding. The plastic parison for forming the container includes a body with an annular shoulder and an upper neck and also with the bottom wall having a central flat portion of substantially the same thickness as the body. The enlarged annular corner portion of the parison also connects to the body and extends downwardly to form a substantially solid rim. The thickness of the annular corner is sufficient to keep the annular corner from having a cavity formed in it during bi-axial stretching. In the method the molded body, annular shoulder, upper neck and the bottom wall are maintained with their relative thicknesses. The annular corner portion is sufficiently enlarged to form a substantially solid rim during stretching. The method is carried out so that the container exhibits the favorable characteristics of injection and blow molding. The blow molding is characterized by bi-axial stretching of the body and uni-axial stretching of the bottom wall. Heat is applied to the mold during blow molding and air is cycled in and out of the container for curing.

7 Claims, 2 Drawing Sheets

ALTERNATE EMBODIMENT

TYP. MOLD TAPER & SINK

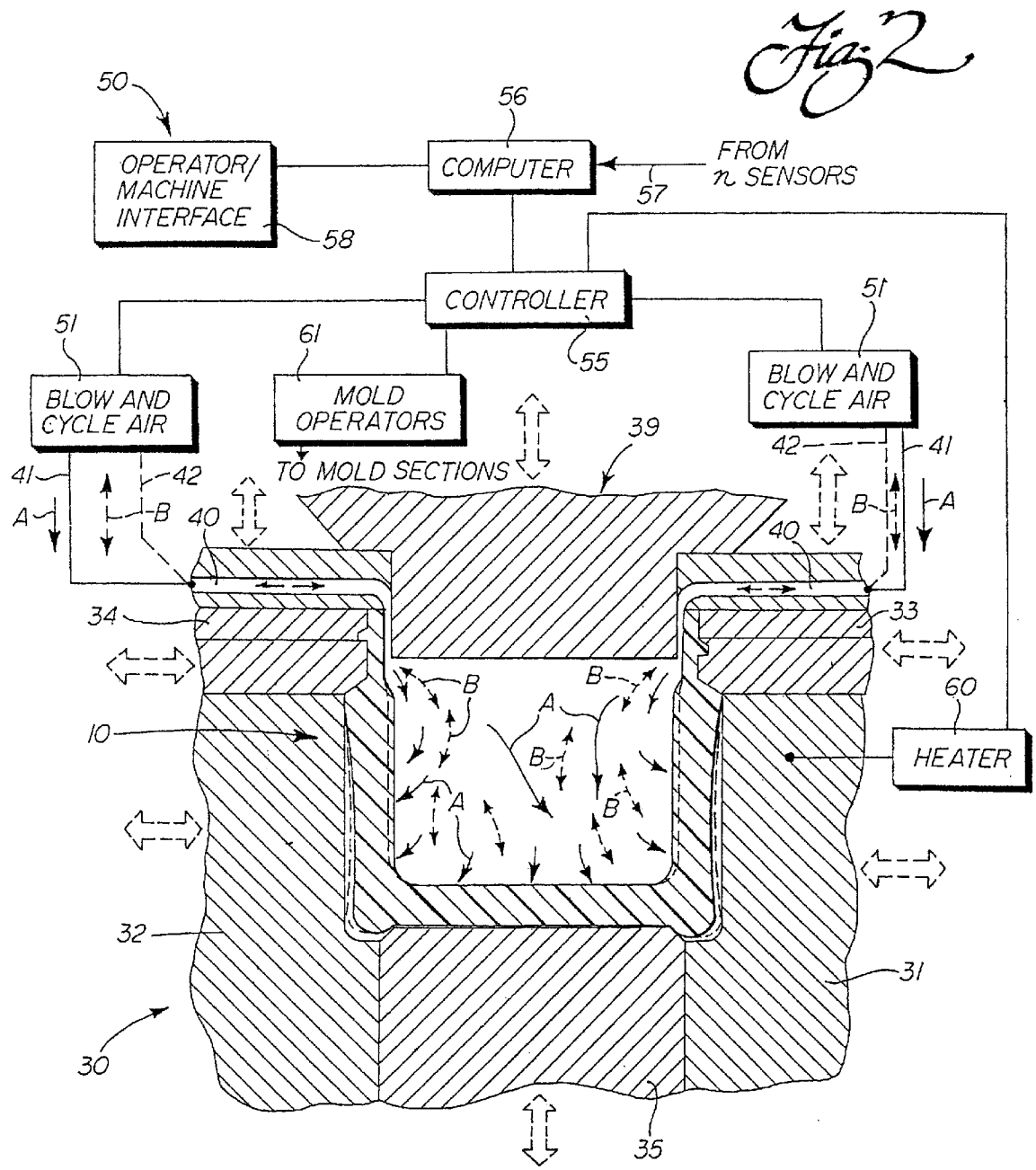

大,874,141

INJECTION/BLOW MOLDED PLASTIC CONTAINER AND METHOD

TECHNICAL FIELD

The present invention relates to plastic containers and related concepts, and more particularly to a container formed from a plastic parison and wherein the favorable characteristics of both injection and blow molding are retained.

BACKGROUND OF THE INVENTION

The use of plastic containers is continuing to grow at a rapid rate. In many marketing areas, such as in marketing of liquid or semi-liquid (viscous) cosmetics and related products, the plastic container is by far the container of choice. The plastic container, such as a bottle or jar, is not only non-breakable but can be molded so as to be more attractive than other containers. Attractive surface textures and embossed designs can easily be included as the container is formed. In addition, from a cost standpoint, plastic is very competitive with the other materials used for containers. One of the most popular containers for the marketing of cosmetic products, as well as other liquid, semi-liquid and cream products, is a blow molded container of a clear plastic, such as polyethylene terephthalate (PET).

The most common approach for forming such containers is by straight blow molding of a parison in a mold. In the past, some smaller containers have been formed by straight injection molding, but in this case the shape of the container leaves much to be desired. For example, in a typical injection molding operation, the inherent mold taper and characteristic sink of the body side walls leaves the container with a somewhat distorted look. For this reason, the blow molding is the most popular process, with of course the parison for the blow molding operation being formed by injection molding. A typical approach for straight blow molding with the parison being formed by injection molding is illustrated in the Nishikawa et al. U.S. Pat. No. 4,164,298, issued Aug. 14, 1979. As set forth in this patent and others, this approach is to provide a relatively large container from a relatively small parison. As a result of the blow molding, the body side wall and the bottom are substantially stretched and are relatively thin. The entire container is formed from a single tubular parison (see FIG. 4 of the '298 patent).

In the approach taught by the '298 patent, the technique leaves much to be desired where an annular rim on the bottom of the container is desired. For example, as shown in FIG. 1, according to these prior art teachings, there is necessarily a hollow ring formed in the annular rim (see rim 3). Furthermore, the body of the container is very thin and this provides difficulty in handling due to the tendency of the side wall to collapse when squeezed or simply picked-up for use.

On the other hand, containers that are injection molded do not suffer these problems since the size of the molding cavity determines the thickness of all parts, including the side wall of the body. While others that have recognized this benefit have tried to solve the problem of mold taper and sink when injection molding so far it has not been accomplished. Especially for certain containers, such as bottles or jars for cosmetic products, there is thus a need for combining the best concepts of injection molding and blow molding into a single inventive approach wherein the finished container retains the favorable characteristics of both an injection molded and a blow molded container. That is, a container that can be made with a body having a strong and stable body and side wall, and an equally strong bottom wall and enlarged annular corner portion. The corner portion should also be free of the characteristic hollow ring that typically results from a straight blow molding operation.

SUMMARY OF THE INVENTION

Accordingly, it is a primary object of the present invention to provide an improved container that is fabricated by combining the best of injection and blow molding so as to have characteristics overcoming the shortcomings of the prior art.

It is another object of the present invention to provide a container, such as a bottle or jar for cosmetic liquid, semi-liquid or cream product, or the like, that is molded by injection molding with the body or side wall and the central flat portion of the bottom wall having substantially the same thickness, and with an enlarged annular portion connecting the body and bottom wall; and further after blow molding having the parts of the container retain substantially the same relationship.

Another object of the present invention is to provide a plastic parison that is injection molded with substantially equal body side wall and bottom wall thicknesses and an enlarged annular corner so that upon being stretched the relative thicknesses are retained and a substantially solid rim is provided in the finished container.

Still another object of the present invention is to provide a method of producing a plastic container from an injection molded plastic parison with substantially equal body and bottom wall thicknesses, and blow molding while maintaining the body proportions substantially the same and forming a substantially solid rim along the annular corner portion.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objectives, and in accordance with the purposes of the present invention as described herein, the present invention contemplates a plastic container with its favorable characteristics being governed by a combination of injection and blow molding. The container is characterized by an injection/blow molded body having an annular shoulder and an upper neck extending from the shoulder and a bottom wall including a central flat portion. The thicknesses of the side wall of the body and the central flat portion of the bottom are substantially the same. Advantageously, an enlarged annular corner portion connects the body with the central flat portion of the bottom and extends downwardly to form a substantially solid rim after the bi-axial stretching during blow molding. Since the container maintains the desirable thickness relationship and there is no cavity formed around the inside of the annular corner portion, the container has the solid rim along the bottom. The favorable characteristics of both straight injection molded and straight blow containers are achieved. The typical mold taper and sink that is characteristic of an injection molded container is eliminated by the blow molding aspect of the present invention.

A related aspect of the present invention is the provision of a plastic parison for forming the injection/blow molded container. The parison has a body with an annular shoulder and an upper neck and a bottom wall including a central flat portion of substantially the same thickness as the side wall of the body. An enlarged annular corner portion of the parison connects the body to the flat portion of the bottom and extends downwardly. There is sufficient thickness in the body and the bottom wall so that upon bi-axial stretching during blow molding, the relative same thicknesses are maintained. Furthermore, the annular corner portion is maintained substantially without change during bi-axial stretching during blow molding. With this injection molded parison of the present invention, the blow molded container retains the favorable characteristics of both injection molding and blow molding.

In accordance with another feature of the present invention, the desirable characteristics of the container are realized by providing a body of the container that is bi-axially stretched whereas the bottom wall is substantially only uni-axially stretched during the blow molding process.

The related method of producing a plastic container, such as a jar or bottle, in accordance with the present invention, is characterized by beginning with an injection molded parison having a body, and bottom wall with a central flat portion, of substantially the same thickness. Connecting the flat portion of the bottom to the body is an enlarged annular corner portion. The blow molding is carried out under conditions that maintain the body at least substantially the same thickness as the bottom wall and maintains the corner portion sufficiently enlarged during stretching to form a substantially solid rim. With the method, the finished container exhibits the favorable characteristics of both an injection and blow molded container.

An additional important feature of the method is allowing bi-axial stretching of the body while restricting the stretching of the bottom wall to substantially uni-axial stretching. Heat is applied to the mold during the blow molding step and air is cycled in and out of the finished container for curing before opening the mold and removing the container.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serves to explain the principles of the invention. In the drawings:

FIG. 4 is a cross section of an alternate embodiment of a container in the form of a bottle of the present invention, and which is formed in the same manner as the jar of FIGS. 1–3; the parison being illustrated in dashed line thus illustrating the method that would be applicable during blow molding in a mold assembly similar to that illustrated in FIG. 2.

Reference will now be made in detail to the present preferred embodiment of the invention, an example of which is illustrated in the accompanying drawings.

DETAILED DESCRIPTION OF THE PREFERRED EMBODIMENT

Figure 1:
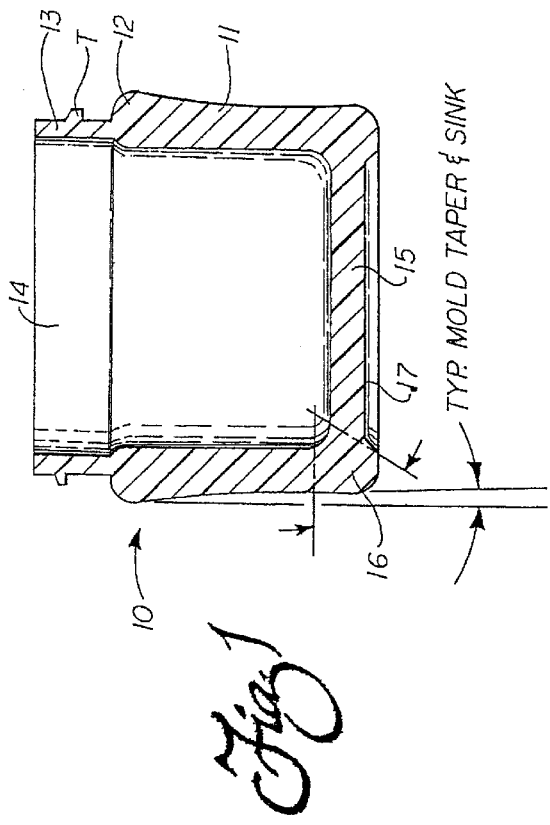
FIG. 1 is a cross sectional view of a representative parison formed by injection molding in accordance with the present invention and illustrating the typical mold taper and side wall sink that is formed.

Reference will now be made in detail to FIG. 1, showing a parison 10, which as illustrated has a profile of a jar, such as for semi-liquid or cream cosmetic products. The parison 10 is formed by injection molding, and as such includes a typical mold taper of approximately 2°–7° and with the body having the characteristic sink along the center of the body or annular side wall. As such, the injection molding process by itself does not provide a suitable container, especially for discriminating purchasers of cosmetic and related products.

Specifically, the plastic parison 10 is formed of a suitable plastic, such as polyethylene terephthalate (PET); although, it is to be understood by those of skill in the art that other suitable plastics can be used. More specifically as to the form of the parison 10, an annular body 11 has a shoulder portion 12 extending upwardly therefrom. An upper neck 13 is above the shoulder portion 12 and defines an open top 14. Typical threads T are formed around the neck 13 to receive a cap (not shown) for the finished container.

It will be understood by those of skill in the art that this particular parison 10 is only one of several that can be produced in accordance with the principles of the present invention. The shape is of course governed by the desired shape of the finished jar (see FIG. 3), or alternatively a finished bottle (see FIG. 4). It will also be clear that variations in the shape of the parison 10 can change from one design to another. For example, while the shoulder portion 12 may in some instances be as illustrated in FIG. 1, in other instances it can be more square or more shallow as the design of the finished jar or bottle dictate.

The mold for injection molding of the parison 10 is not illustrated in the drawings, since it is well known in the art. Also as mentioned above, the selection of a particular plastic resin is governed by several factors, such as the product being packaged, the prospective user of the product and the manner of dispensing that is desirable. Regardless of which plastic is selected, the relative shape of both the parison 10 and the method of forming the finished container is basically the same. The adjustment of the operating parameters of the molding process does vary from one container to another, but this is within the skill of those experienced in the art of injection/blow molding processes.

The parison 10 also includes a bottom wall 15 with a central flat portion of substantially the same thickness as the body 11. In addition, an enlarged annular corner portion 16 is provided to connect the body 11 to the bottom wall 15 and extends in a downward direction to form a bottom recess 17.

The thickness of the body 11 and the bottom wall 15 is sufficient so that after bi-axial stretching during blow molding the body 11 remains at least substantially the same thickness as the bottom wall. Also, the annular corner 16 is sufficiently thick to form a solid bottom rim. As will be seen in detail, the thickness is such that even upon being extended by bi-axial stretching from blow molding, the rim remains solid; i.e. no hollow cavity is formed. This feature provides desired added strength and stability to the finished container. In essence, the favorable characteristics of both an injection molded and a blow molded container is realized by use of the parison 10 of FIG. 1.

As mentioned, the particular plastic resin selected for forming the parison 10 can vary with respect to the end use of the container. A plastic resin that is particularly adapted for forming of a container from the parison 10 to be used for a liquid, semi-liquid or cream cosmetic product is polyethylene terephthalate (PET).

Figure 3:
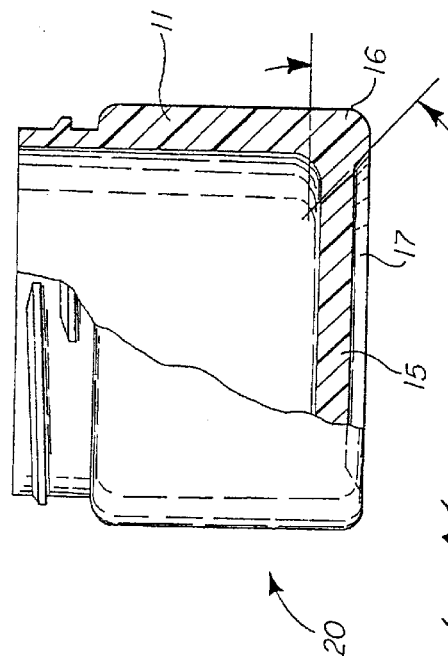
FIG 3 is a side view of a finished container, in the form of a jar of the present invention, with one side broken away in cross section for clarity.

With reference now to FIG. 3 of the drawings, a finished plastic container 20 formed by blow molding of the parison 10 of FIG. 1 is illustrated. As finished, the body 11 is now formed so as to remove the deleterious mold taper and sink that is caused by the typical injection molding process. The bottom wall 15 includes the central flat portion that is substantially the same thickness as the body 11. Around the bottom of the container is the enlarged annular corner 16 that is sufficiently thick to form the substantially solid rim after the bi-axial stretching during the blow molding process. The finished container 20 exhibits outstanding strength and stability so as to advantageously prevent the jar from collapsing when picked up by the user. When used as a jar, the relatively thick body 11 and the bottom wall 15, along with the enlarged annular corner 16 providing the solid rim and recess 17, cause the jar to have a highly favored look and feel, especially in the cosmetic field.

Also as can be noted from comparing FIGS. 1 and 3, the parison 11 is stretched bi-axially with respect to the body 11, but the bottom wall 15 is substantially stretched only uni-axially during the forming process. This contributes to the advantages that are attendant to providing substantially equal thicknesses of the body 11 and the central portion of the bottom wall 15, as well as the enlarged annular corner 16.

As will now be seen more in detail, an important advantage of the method of the present invention is that it is capable of providing the container 20 that is characterized by the desirable relatively thick body 11, the relatively thick bottom wall 15 and the enlarged annular corner portion 16. This is accomplished through a single injection molding step combined only with a single step stretching of the parison 10 by blow molding.

Figure 2:
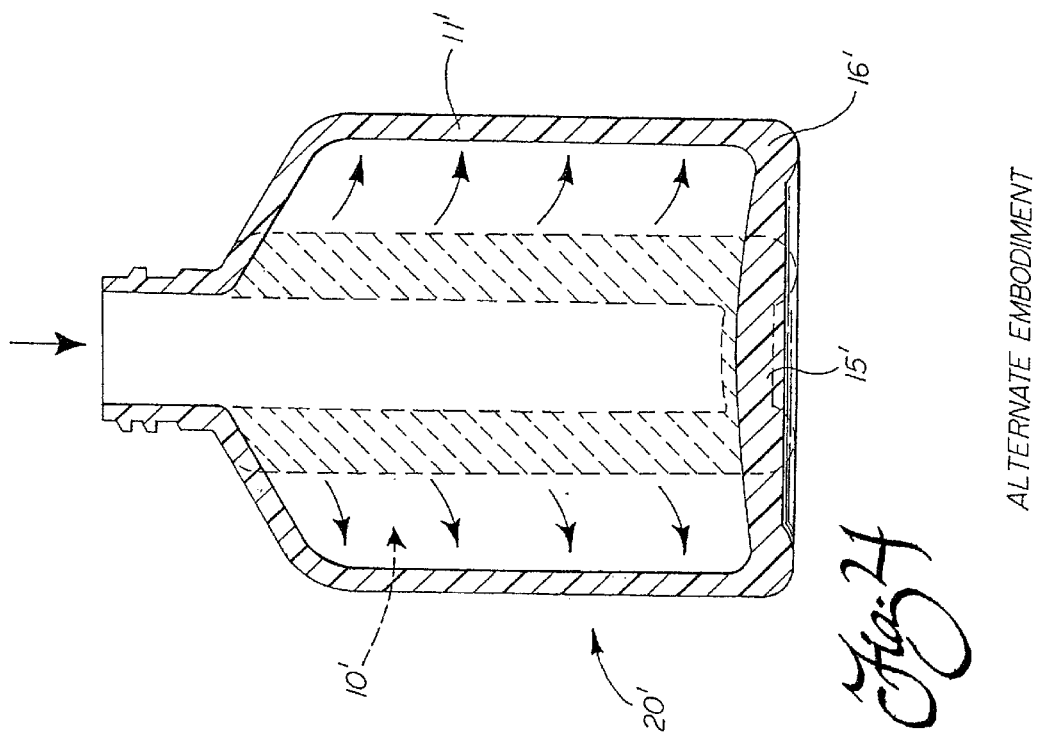
FIG. 2 is a cross sectional view of a mold assembly illustrating the manner in which the finished container is formed by blow molding, and including a schematic diagram of a combined circuit for carrying out the method of forming the container.

Thus, referring specifically to FIG. 2 of the drawings, those details that make the simplified method of producing the container 20 of the present invention unique, can be explained. A suitable mold assembly 30 includes separable side mold members 31, 32 and similar separable upper mold parts 33, 34. Opposite the upper mold parts 33, 34 is a retractable bottom mold part 35. As shown, with the injection molded parison 10 in the cavity, substantially the entire cavity is filled except for approximately 3–7% at the bottom and around the periphery. As will be clear, the cavity is formed by bringing together the mold members/parts 31–35 (see the dashed line movement arrows in FIG. 2).

Above the mold parts 33, 34 is provided a pressurized air feed ring and cap generally designated by the reference numeral 39. A plurality of radial feed passages 40 is formed in the feed ring and receives pressurized air from lines 41 in order to blow mold the parison 10 into the container 20. A similar line 42, shown in dashed line form also connects to the radial passages 40 to provide alternating flow of cooling air into and out of the finished container 20 for curing at the end of the process.

An operating circuit 50 is illustrated in FIG. 2 to show one approach for controlling the method of producing the plastic container 20 by blow molding in accordance with the present invention. First, a source of pressurized air 51 is provided. In the blow molding stage of the production method, the source 51 provides the flow of pressurized air into the radial passages 40. The pressure selected need only be sufficient for molding the particular container 20, such as the jar shown in the drawing. The pressure air is depicted by the full line action arrows A. The air source 51 is also operative to provide lower pressure, alternating air flow, into and out of the container 10 after it is fully stretched and formed, as denoted by the dashed line action arrows B. This mode of operation allows the finished container to be rapidly cured without being removed from the mold assembly 30.

A suitable controller 55 is provided to operate the air source 51 in both the blow molding and the curing modes, in response to a computer or CPU 56. Through a connection 57 the computer 56 can receive multiple signals from n sensors (not shown) strategically placed within the mold assembly 30 to monitor and adjust as necessary all operating parameters, such as temperature and pressure. In order to change the program of the computer 56 to fit a particular container 20, a standard operator/machine interface 58 is included.

The controller 55 can also be utilized to operate and regulate a heater 60 for the mold assembly 30. Furthermore, the controller 55 serves to control the mold operators 61 to provide the timed movement of each of the mold members/parts 31–35.

From the foregoing description, the method of producing a plastic container 20, can now be fully understood. The first step is to provide the injection molded plastic parison 10, that can be subject to the typical mold taper and sink, as shown in FIG. 1. The parison 10 is placed in the mold assembly 30, as illustrated in FIG. 2. Once the mold members/parts 31–35 are closed, air pressure sufficient to expand and stretch the parison 10 to its finished shape (FIG. 3) is applied. As indicated above, this pressurized air flows into the parison 10, as depicted by the flow action arrows A, which in turn originates from the air source 51. As the pressure continues, the body 11 stretches outwardly from the full line position in FIG. 2, to finally assume the full line shape of the container in FIG. 3. As illustrated, the thickness of the body 11 and the bottom wall 15 are maintained at the same relative thickness, and advantageously the corner portion 16 remains sufficiently enlarged to form a substantially solid rim during the stretching of the parison. As a result, the finished container exhibits the favorable strength and stability characteristics of an injection molded container, but without the deleterious mold taper and sink along the body 11. The finished container 20 at the same time exhibits the finished favorable look and feel of a blow molded container with straight peripheral wall surfaces around the body 11. Additionally, the container has a relatively thick bottom 15 with a recess 17 and an enlarged annular corner portion 16.

As an alternative to the jar shaped container 20, the present invention envisions an alternate bottle shaped container 20'. In this instance, the major characteristics of the body 11', the bottom wall 15' and the enlarged annular corner portion 16' are maintained. The parison 10' is shown in dashed line form in FIG. 4. In this embodiment, the stretching from the parison 10' to the finished container 20' is in the range of 8–15%. As in the embodiment of FIGS. 1–3, the body 11 is bi-axially stretched while the bottom wall 15 is substantially uni-axially stretched. The end result of forming either the container 20 or the container 20', or a similar shaped container, whether in the form of a jar, a bottle or the like, the increased strength and stability, along with the enhanced look and feel of the container provides substantial improvement over the prior art, especially with respect to the cosmetic field.

In order to properly blow mold the container 20, 20', sufficient heat from the heater 60, as controlled from the n sensors, applies and controls the heat to soften the parison 10, 10'. In addition, after the blow molding process is complete, cooling air is cycled in and out of the finished container for curing. Only then, is the mold opened and the container 20, 20' removed.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A plastic parison for forming by injection and blow molding into a finished plastic container with integral inner and outer wall surfaces, comprising:

an injection molded body having an annular shoulder and an upper neck extending from said shoulder, a bottom wall including a central flat portion of substantially the same thickness as said body and an enlarged annular corner portion connecting to said body and extending downwardly;

said body and said bottom wall being sufficiently thick so that after bi-axial stretching during blow molding to form the container said body remains at least substantially the same thickness as said bottom wall; and said annular corner being sufficiently thick to form a substantially solid rim after bi-axial stretching of said body during blow molding, whereby upon final forming by blow molding said container retains the favorable characteristics of both an injection molded and a blow molded container.

2. A finished plastic container with integral inner and outer wall surfaces formed by injection and blow molding comprising:

an injection molded body having an annular shoulder and an upper neck extending from said shoulder;

a bottom wall including a central flat portion of substantially the same thickness as said body and an enlarged annular corner portion connecting to said body and extending downwardly; and said annular corner being sufficiently thick to form a substantially solid rim after bi-axial stretching of said body during blow molding, whereby said container exhibits the favorable characteristics of both an injection molded and a blow molded container.

3. The container of claim 2, wherein said body being bi-axially stretched and said bottom wall being substantially uni-axially stretched during blow molding.

4. A method of producing a finished plastic container with integral inner and outer wall surfaces comprising the steps of:

providing an injection molded body having an annular shoulder and an upper neck extending from said shoulder, a bottom wall including a central flat portion of substantially the same thickness as said body and an enlarged annular corner portion connecting to said body and extending downwardly; and blow molding said container while maintaining said body at least substantially the same thickness as said bottom wall and said corner portion sufficiently enlarged during stretching of said body to form a substantially solid rim, whereby said container exhibits the favorable characteristics of both an injection molded and a blow molded container.

5. The method of claim 4, wherein blow molding of said body is by bi-axial stretching and said bottom wall is by substantially uni-axial stretching.

6. The method of claim 4, wherein is further provided the step of:

applying heat to said mold during blow molding.

7. The method of claim 4, wherein is further provided the step of:

cycling air in and out of said finished container for curing; and opening said mold and removing said container.

* * * * *